United States Patent [19] [11] 4,157,005
Orlando et al. [45] Jun. 5, 1979

[54] DIRECT-LOADING CROP HARVESTING APPARATUS

[75] Inventors: Franklin P. Orlando, Morgan Hill; Ronald W. Droll, Modesto, both of Calif.

[73] Assignee: FMC Corporation, San Jose, Calif.

[21] Appl. No.: 775,002

[22] Filed: Mar. 7, 1977

[51] Int. Cl.² ............... A01D 61/02; A01D 75/22
[52] U.S. Cl. ............... 56/228; 56/327 R; 198/632; 198/313; 414/523
[58] Field of Search ............ 56/327 R, 16.6, 228; 198/313, 632, 581; 214/520, 83.26, 83.24; 37/90, 97

[56] References Cited

U.S. PATENT DOCUMENTS

| | | | |
|---|---|---|---|
| 2,590,965 | 4/1952 | Huston | 214/83.1 |
| 2,647,525 | 8/1953 | Duda et al. | 134/63 |
| 2,651,426 | 9/1953 | Orendorff | 214/355 |
| 2,892,556 | 6/1959 | Lowe | 214/83.24 |
| 3,078,926 | 2/1963 | Ries et al. | 171/14 |
| 3,085,675 | 4/1963 | Feiteira, Jr. | 198/632 |
| 3,302,770 | 2/1967 | Schwalm | 198/632 |
| 3,340,935 | 9/1967 | Csimma | 56/327 R |
| 3,437,151 | 4/1969 | Button | 171/17 |
| 3,539,067 | 11/1970 | Secrist et al. | 214/83.26 |
| 3,722,673 | 3/1973 | Bedwell et al. | 171/18 |
| 3,768,673 | 10/1973 | Nydam et al. | 214/83.24 |

Primary Examiner—Russell R. Kinsey
Assistant Examiner—Paul J. Hirsch
Attorney, Agent, or Firm—R. S. Kelly; T. J. McNaughton

[57] ABSTRACT

An improved direct-loading crop harvester is disclosed as having an articulated elevator which is retractable into a berth in the harvester. During transportation of the harvester from field to field, the lower leg of the loading elevator is horizontally positioned within the berth upon a slidable support cradle, and the upper leg of the elevator is nestled vertically at a side of the berth. Prior to harvesting, the elevator is pulled from the side of the berth with the lower leg resting on the cradle. The elevator is then connected by pivot and hydraulic cylinder mechanisms to the berth such that the lower leg tilts upwardly at the side of the harvester and the upper leg projects outwardly from the upper end of the lower leg. During the harvesting operation, crops are fed to the elevator by a conveyor and are discharged at a selected position above an attendant trailer, preferably through a detachable decelerator mechanism.

10 Claims, 8 Drawing Figures

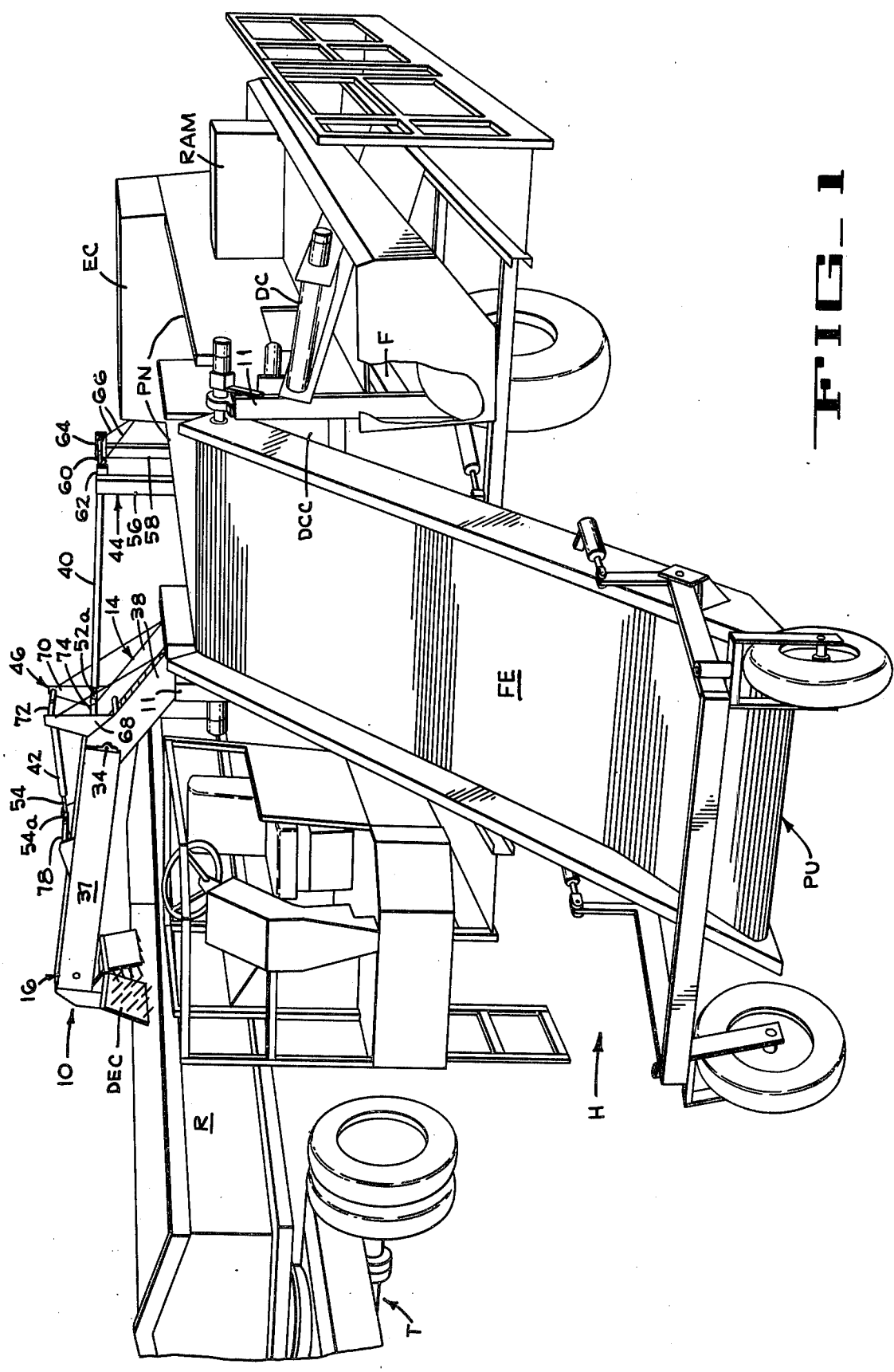
FIG_1

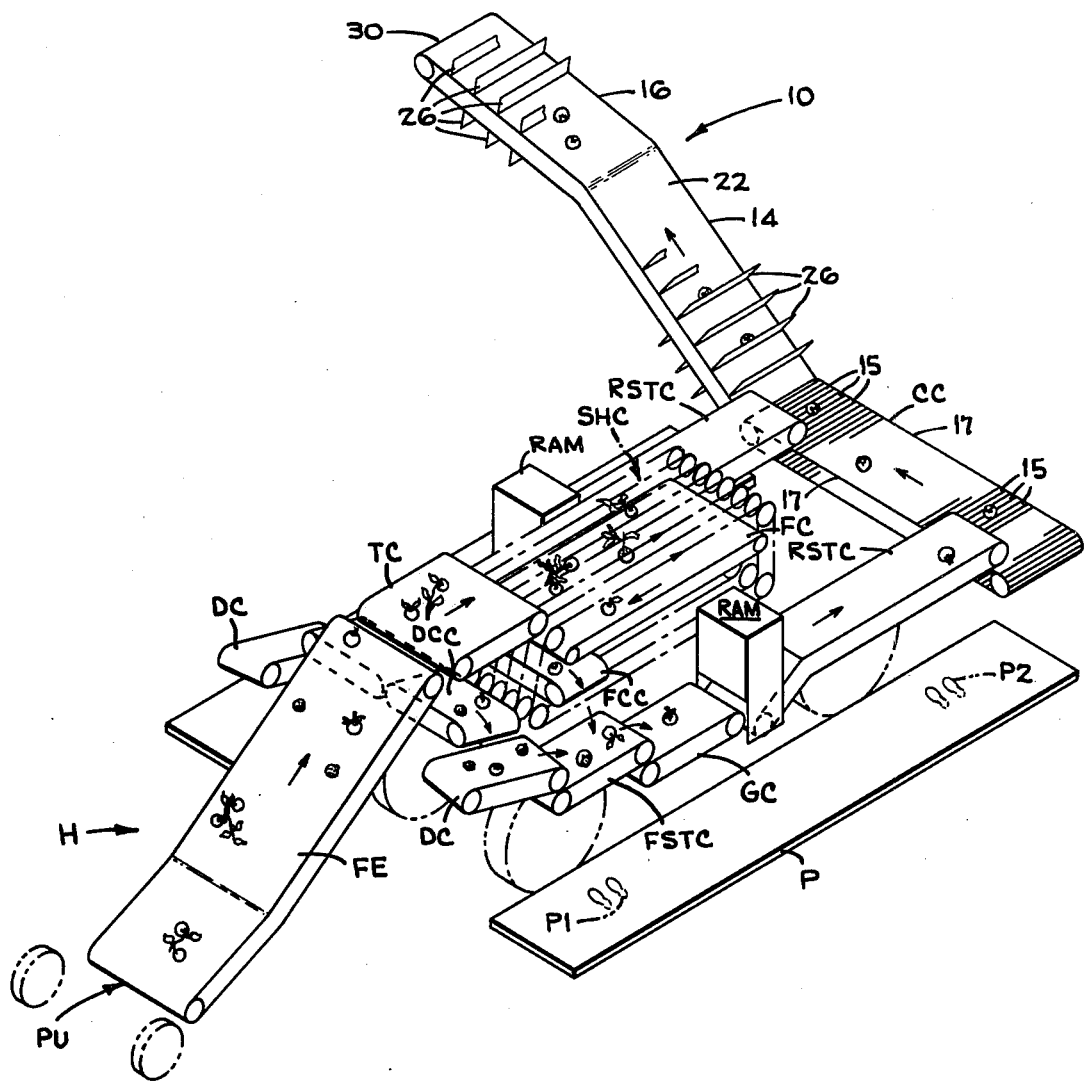
FIG_2

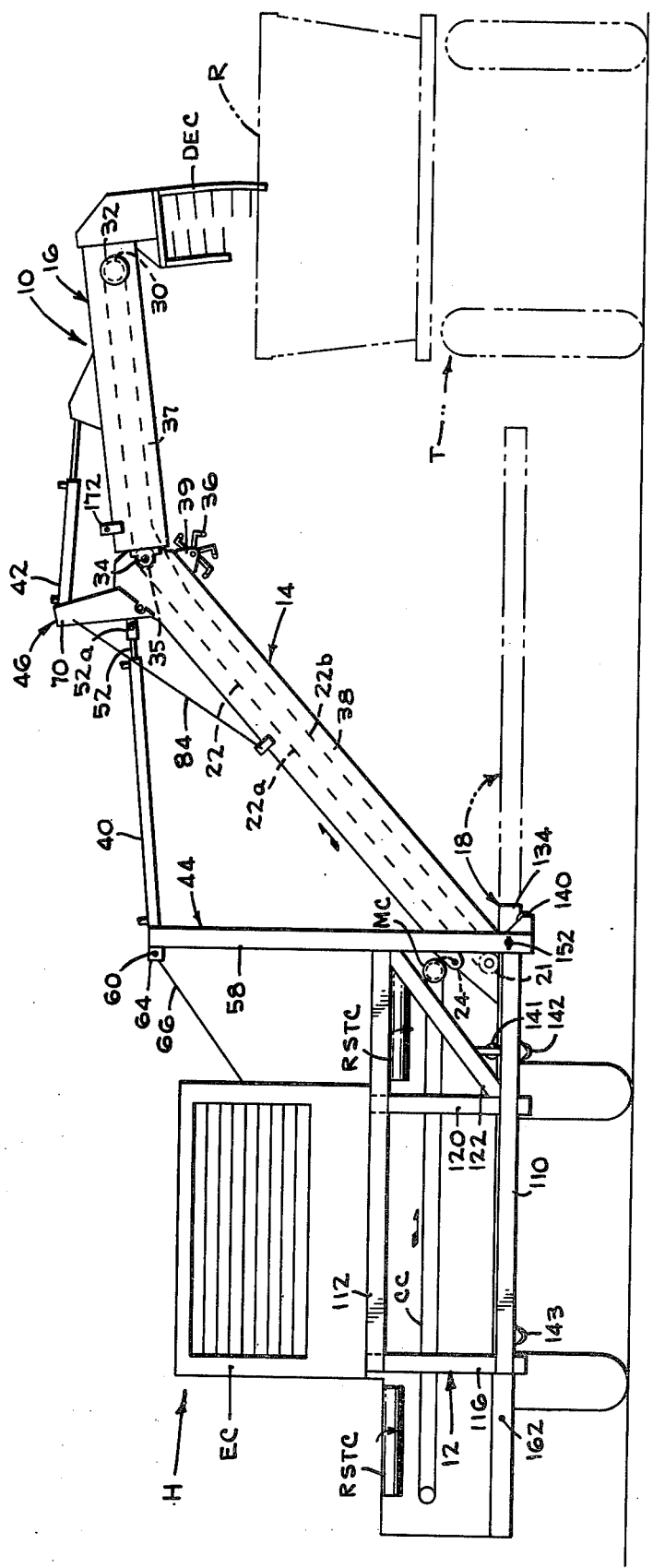

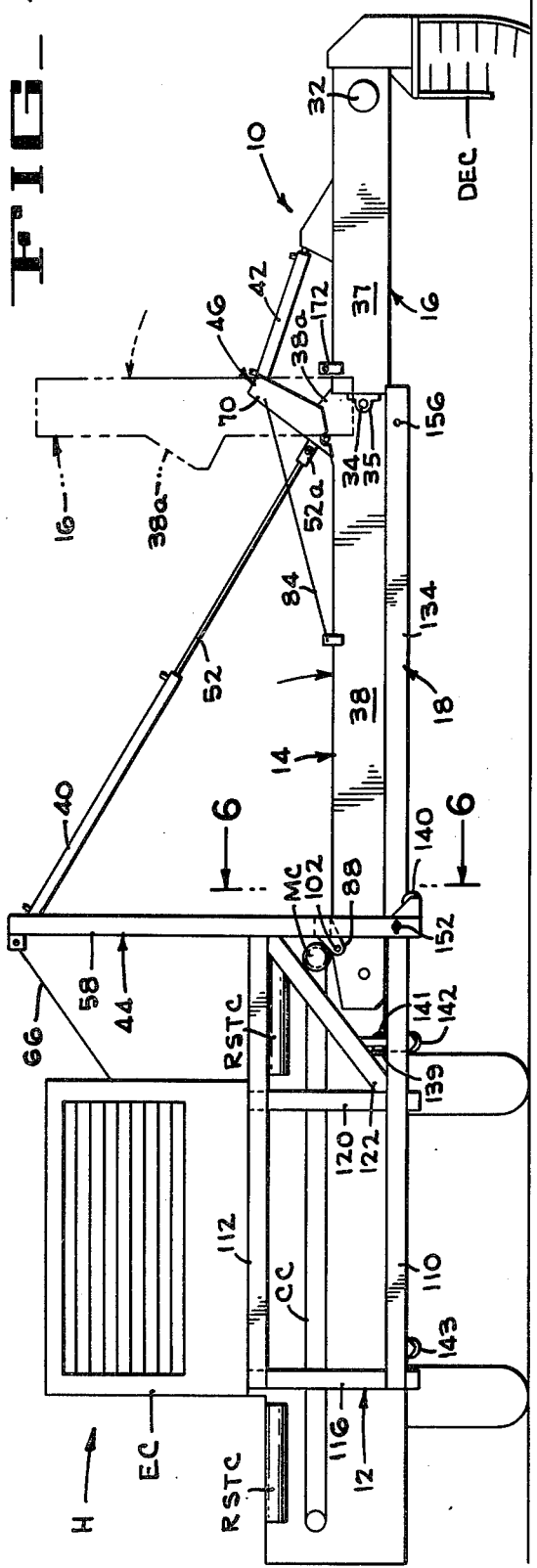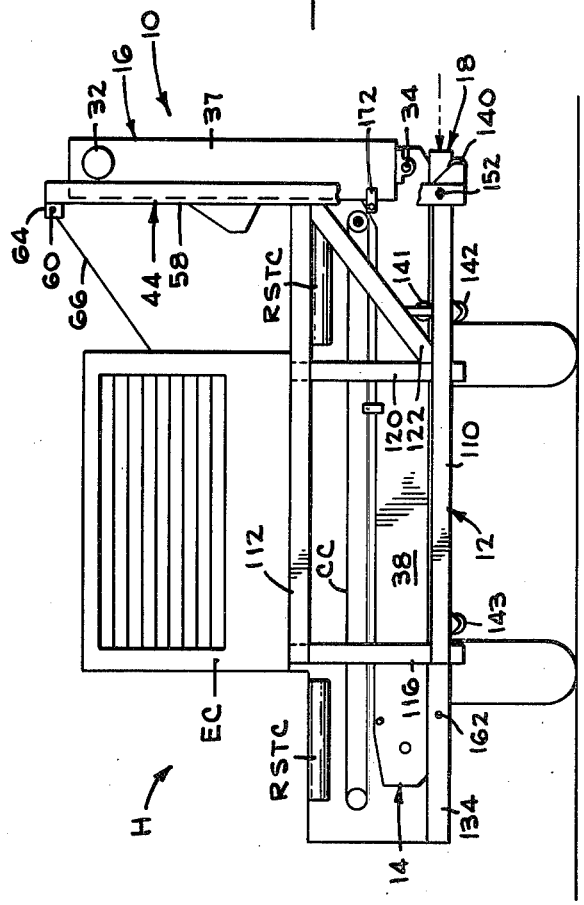

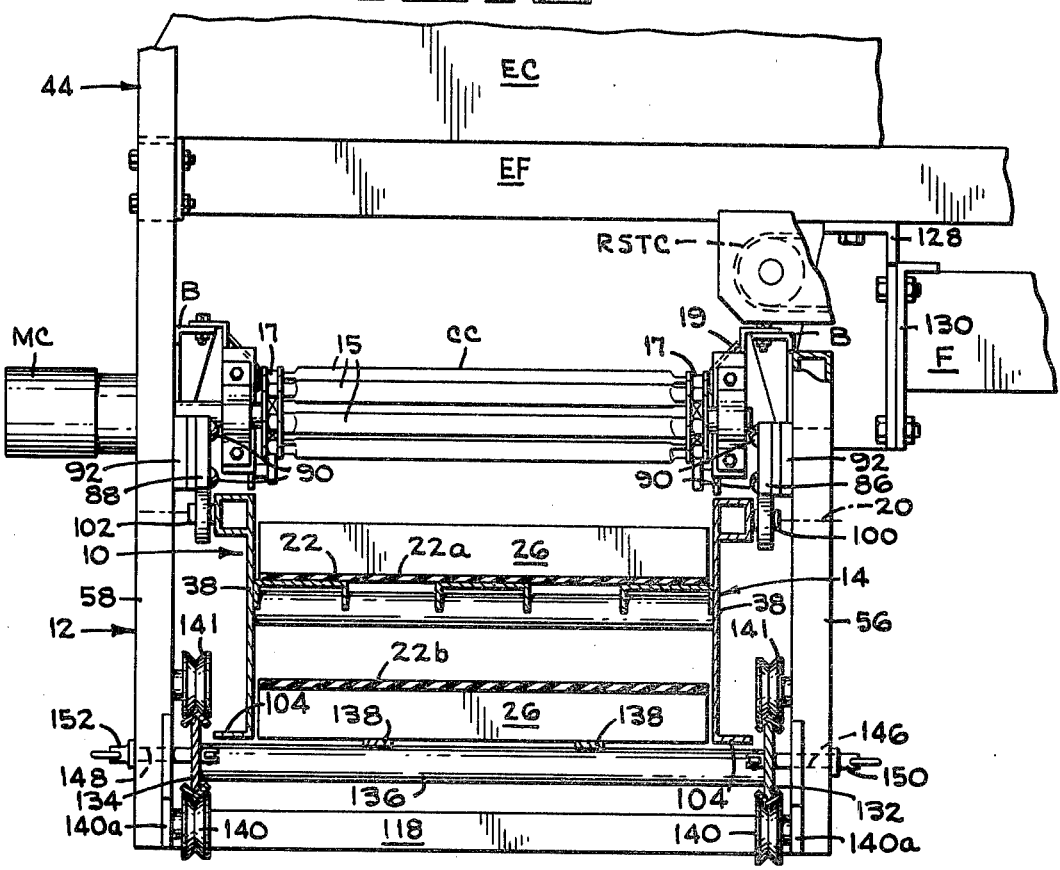
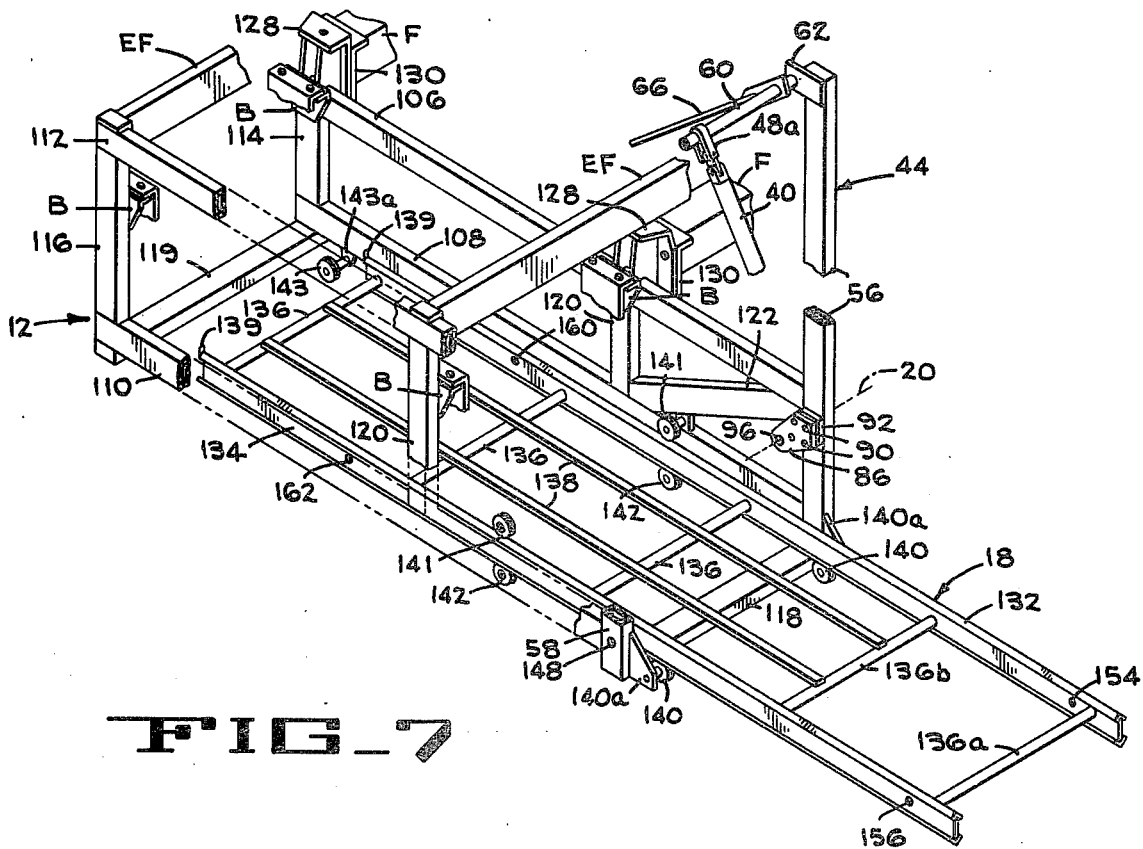

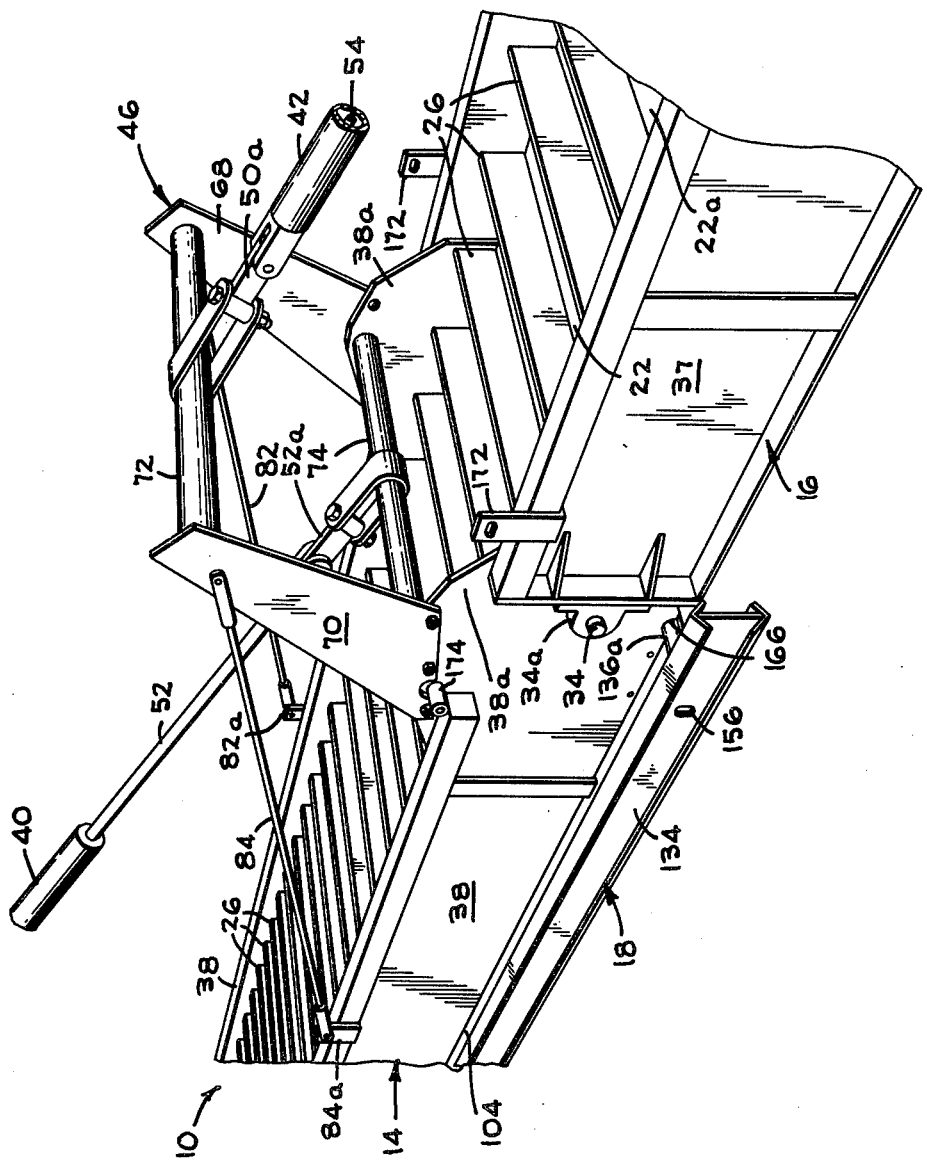

DIRECT-LOADING CROP HARVESTING APPARATUS

BACKGROUND OF THE INVENTION

1. Field of the Invention

This invention generally relates to crop harvesters having conveyor means for transferring harvested crops to a receptacle which is separate from the harvester, such harvesters being hereinafter referred to as direct-loading harvesters. More particularly, the present invention concerns an improved direct-loading harvester of the type which includes a discharge elevator projecting laterally and outwardly of the harvester vehicle.

2. Description of the Prior Art

Direct-loading harvesters have been known in the art for many years and have recently come into prevalent use in the tomato harvesting field. Such harvesters are arranged to harvest tomato plants grown in rows, to elevate the harvested plants to shaker conveyors for separating tomatoes from their vines, to carry the tomatoes from the shaker conveyors to sorter conveyors when undesired tomatoes and trash are removed, and to finally elevate the remaining tomatoes from the harvester to an attendant truck or trailer for delivery elsewhere.

U.S. patents which disclose various forms of direct-loading tomato harvesters are listed as follows: U.S. Pat. Nos. 3,690,383; 3,579,968; 3,566,881, 3,511,038; 3,469,383; 3,437,151; 3,390,768; 3,340,935; and 3,078,926. Many of these prior art harvester machines employ a discharge elevator comprising a single element which extends from a lower portion of the side of the harvester upwardly to a distance well above the delivery bin or receptacle of the attendant truck or trailer. A decelerator device, or chute, is customarily employed at the discharge end of the elevator to slow down the descent of the fragile tomatoes after they are ejected from the elevator.

In order to assure proper loading of the delivery receptacle, it has been found to be preferable to employ a dog-leg type of elevator assembly. By dog-leg assembly, it is meant that the elevator includes a lower portion, or leg, extending from the side of the harvester and an upper, or second, leg pivotably connected to the upper end of the lower leg and having the decelerator mechanism at the discharge end thereof. Usually, the lower leg is substantially longer than the upper leg, the upper leg serving mainly to carry the crops from the lower leg to a selected vertically spaced position above the delivery receptacle. A dog-leg conveyor, although not extending upwardly from the lower portion of the side of a harvester and thus not functioning as an elevator, is shown in the aforementioned U.S. Pat. No. 3,579,968, wherein a first conveyor section extends horizontally from a high location on the harvester and a second outer conveyor section extends outwardly from the outer end of the first portion. In this prior art apparatus, the outer conveyor section is pivotally connected to the first conveyor section and is removable. In harvesters of this type, it is conventional for the removable outer conveyor section to have its own conveyor belt and drive unit.

To enable the harvester to be moved conveniently and safely from field to field, the prior art elevators or discharge conveyors were either pivoted upwardly as much as possible toward the vertical at the side of the harvester, or the elevator (or its outer leg) was removed from the harvester and transported separately. The aforementioned U.S. Pat. No. 3,579,968, for example, discloses two typical transport modes for discharge conveyors. In the form having a single element elevator tilted upwardly from the bottom side position on the harvester, the whole elevator is taken off the harvester before the harvester is driven off the field. In the other form, involving the aforedescribed articulated type of conveyor, the outer portion is removed from the harvester and stored separately (e.g., on the feeder elevator of the harvester); because of this requirement, the outer conveyor section will typically have an independent belt and drive mechanism.

The removal and separate storage of either all or a portion of the discharge conveyor requires special equipment, such as fork-lift trucks or cranes, and generally is a time-consuming, unproductive operation. The known elevators are too bulky to be handled without such equipment. This is particularly true of the known harvesters having dog-leg types of discharge elevators wherein both sections of the elevator are removed to put the harvester in a transport mode.

The harvesters having a single leg discharge conveyor folded upwardly for shipment have also proven to be unsatisfactory due to the width and height of the harvester as a whole when the conveyor is in such a stow position. When this type of direct-loading harvester is moved by truck from field to field, or from the manufacturer to the user, the discharge elevator projects hazardously high above the road surface.

SUMMARY OF THE INVENTION

The primary object of the present invention is to provide a direct-loading harvester with an improved discharge elevator assembly which obviates the aforementioned problems or shortcomings. In accomplishing this object, the discharge elevator is retained, when in its stow position, within a storage framework, or berth, which extends transversely of the harvester. In a preferred embodiment, the elevator is articulated with the lower leg only being received in the berth while the upper leg projects upwardly at the side of the berth. Preferably, the lower leg is stowed on a slidable cradle, or rack, adapted to telescope out from and back into the berth. The cradle, together with the discharge elevator, are pulled from the berth to a position such that the inner, or input, end of the elevator is below the discharge end of a fixed feeder conveyor which is also oriented transversely of the path of movement of the harvester. The input end of the elevator is then pivotally connected to the berth, and the lower leg of the discharge conveyor is rotated upwardly to a desired operating position. After pulling the elevator from the harvester, the upper end of the lower leg is preferably adjustably connected by a hydraulic cylinder to the harvester or to the berth, and then the upper leg is adjustably connected (also preferably via hydraulic means) to the lower leg. This arrangement permits the articulated, or dog-leg, elevator to be stowed with minimum vertical and horizontal projection from the harvester body and yet readily be assembled for operation. Advantageously, the articualted elevator may employ a single drive motor and one endless conveyor belt.

The features of the invention, as indicated above, and other objects and advantages will appear more fully from the detailed description below, when taken in conjunction with the drawings. It is understood that the drawings are employed merely to illustrate and not to define the limits of the invention, reference being had for this purpose to the appended claims.

BRIEF DESCRIPTION OF THE DRAWINGS

FIG. 1 is a somewhat diagrammatic view in perspective of the direct-loading harvesting machine of the present invention viewed from its left front end;

FIG. 2 is a diagrammatic perspective of the major components of the conveyor system of the harvesting machine;

FIG. 3 is an elevational view taken from the rear of the harvesting machine, the extended position of a slidable support cradle for the discharge elevator being shown in phantom lines;

FIG. 4 is also a rear elevational view of the harvesting machine, similar to FIG. 3 but showing the discharge elevator after it has been lowered to a resting position on the support cradle and with the alternate position of the upper leg of the elevator after it has been swung into and secured in an upright stowable position being shown in phantom lines;

FIG. 5 is another rear elevational view of the harvesting machine, similar to FIGS. 3 and 4 but showing the discharge elevator in its stow position;

FIG. 6 is an enlarged cross section taken on line 6—6 of FIG. 4.

FIG. 7 is a perspective view, partially broken away, of the berth and cradle which compactly store the discharge elevator of the harvesting machine; and FIG. 8 is an enlarged perspective view of the hinged central portion of the discharge elevator of the harvesting machine when the elevator is in its horizontally extended position, as shown in FIG. 4.

DESCRIPTION OF THE PREFERRED EMBODIMENTS

With reference to FIGS. 1-8, the present invention concerns a discharge elevator, or conveyor, 10 and an elevator storage framework 12 which are illustrated (FIG. 3) as being incorporated on the trailing, or rear, end of a tomato harvester H. When in a harvesting mode (FIGS. 1-3), the discharge elevator 10 transfers harvested crops, e.g., tomatoes, from the harvester H to the receptacle R of an attendant trailer T. The utility of the discharge elevator 10 and its storage means is not limited to the disclosed harvesting machine. For this reason, only sufficient details of the harvester are specified to illustrate one useful environment for the present invention. Those skilled in the crop harvesting art will readily appreciate that the present discharge elevator and its storage means may be incorporated into harvesting machines other than the type illustrated and described herein.

Briefly, and with general reference to broad functions and FIGS. 1 and 2 of the Drawings, the tomato harvesting machine H is adapted to be propelled along a path of plants to be harvested and includes a pickup, or harvesting, mechanism PU, supported on a pair of front wheels, which cuts vines along the path at ground level and conveys the vines with the attached and loose tomatoes onto a feeder, or pickup, elevator FE. The feeder elevator FE conveys the vines and tomatoes to a central section of the harvester disposed between a pair of upstanding side panels PN (FIG. 1) and to the front of an engine compartment EC (FIG. 1) situated at the rear end of the harvester. The side panels PN are attached to longitudinal beams of the main frame F, as shown in FIG. 1, and also to upright structural tubes 11 at the front of the harvester. The feeder elevator and pickup assembly is journaled in brackets removably attached to the upper ends of the upright tubes 11.

At the top front of the central section of the harvester there is a longitudinal transfer conveyor TC (FIG. 2) having its input end positioned to receive the output of the feeder conveyor FE but spaced a short distance from the end of the conveyor FE to allow loose tomatoes and dirt clods to drop from the moving masses of vines and attached tomatoes through the space between the two conveyors. These loose tomatoes and dirt clods are then transferred laterally by short, cross conveyors DCC to inclined, tilted dirt conveyors DC which run forwardly at the sides of the machine (FIG. 2). The inclined, tilted conveyors DC are adapted to permit loose tomatoes to roll downwardly toward the outside and rearward portions thereof, thereby facilitating transfer of loose tomatoes to a pair of front sorter conveyors FSTC positioned at the trailing ends of the dirt conveyors DC. The dirt and trash left on the flat belt surfaces of the dirt conveyors DC will be ejected from the front ends of the conveyors onto the ground. Sorters, who stand at a position P1 (FIG. 2) on platforms P, remove undesirable tomatoes and trash transferred from the dirt belts to the front sorter conveyors FSTC at their respective side of the harvester.

The transfer conveyor TC discharges vines with attached fruit to a shaker conveyor SHC (formed of a plurality of parallel chains) for oscillating the vines and tomatoes and removing the tomatoes from the vines. The tomatoes then drop through the openings between the chains in the shaker conveyor onto a forwardly running undershaker fruit conveyor FC which propels the fruit onto fruit cross conveyors FCC which, in turn, carry the fruit transversely through the side panels PN at the opposite sides of the machine. A shaker conveyor mechanism which is suitable for use as the conveyor SHC is illustrated in U.S. Pat. No. 3,071,196 to Scheidenhelm, it being understood that many other satisfactory shaker devices are well known to those skilled in the art.

The tomatoes removed by the shaker conveyor SHC and delivered to the fruit cross conveyors FCC are received on each side of the harvester by the front sorter conveyors FSTC. The front sorter conveyors FSTC thus have loose fruit thereon which have been once inspected for ripeness by the manual sorters at position P1. The disclosed harvester also includes mechanized ripeness assurance mechanisms, or automatic color sorters, RAM at each side of the harvester which are adapted to singulate the tomatoes transferred from the front sorter conveyor FSTC into a selected number of parallel rows, detect the colors or color intensities of the tomatoes at selected positions in the rows, eject those tomatoes whose colors are indicative of insufficient ripeness, and move the remaining fruit to a pair of rear sorter conveyors RSTC. Singulation is provided by grooved conveyors GC which receive fruit from the front sorter conveyors FSTC with the individual tomatoes falling into the grooves formed in the belt surfaces of the conveyors GC. Photosensitive detectors sense the colors of fruit in or near the particular rows, and in the event that the color of a particular tomato is improper (e.g., green rather than red), an ejection device is actuated by the detector to cause the unripe fruit to be diverted to the ground. The ripe tomatoes are discharged from the end of the grooved conveyors GC to a receiving flight on the rear sorter conveyors RSTC.

Blowers may be employed to clean vine pieces, dirt and other matter which may deleteriously affect the color sorting of the tomatoes delivered to the front sorter conveyors FSTC. Preferably, the blowers are positioned to direct air currents toward the front of the harvester between the discharge end of the undershaker fruit conveyor FC and the fruit cross conveyors FCC.

Sorters, also known as culling operators, who stand near positions P2 (FIG. 2) on the longitudinal platforms P, inspect the tomatoes on the rear sorter conveyors RSTC and remove any remaining cull tomatoes, dirt, rocks, vine pieces and other trash.

The rear sorter conveyors RSTC at each side of the machine discharge the thus-inspected tomatoes onto a cross feed conveyor CC, driven by a motor MC (FIG. 3), extending transversely of the harvester generally below the engine compartment EC at the rear of the machine. The cross feed conveyor CC is comprised of a plurality of closely spaced, parallel bars 15 (FIGS. 2 and 6) which are supported at their opposite ends by a pair of endless chains 17. As seen in FIG. 6, the discharge ends of the rear sorter conveyors RSTC project rearwardly beyond the rear ends of the longitudinal members of the main frame F to a position above and just forwardly of the forwardly located chain 15 of the cross feed conveyor CC, and a sloped guide 19 positioned just below the discharge ends of the rear sorter conveyors deflects the discharged tomatoes inwardly onto the cross conveyor CC. The guide rail 19 extends the length of the cross conveyor CC, and a similar rail is mounted in an opposed position at the other side of the cross conveyor. The cross conveyor CC is mounted directly to the upright members of the elevator storage framework 12 by four brackets B as shown in FIGS. 6 and 7.

The discharge elevator 10 receives the tomatoes from a discharge end of the cross conveyor CC and conveys them outwardly and upwardly to a position above the receptacle R of an attendant trailer T (FIG. 3). A decelerator mechanism DEC is connected to the discharge end of the elevator for the purpose of slowing the descent of the marketable tomatoes into the receptacle R to prevent damage to the fruit.

It will be seen from the drawings that the harvester H is self-propelled. The engine is preferably mounted in the compartment EC toward the opposite side of the harvester from that from which the elevator 10 extends so that during harvesting the weight of the elevator will be counterbalanced. The compartment EC is supported by a pair of longitudinally extending frame members EF which are detachably mounted to the main frame F. The frame members EF (FIGS. 6 and 7), as will be hereinafter described, also support the elevator storage framework 12 of the present invention. The engine propels the harvester and drives the hydraulic pumps that power various hydraulic motors and cylinders for operating components of the discharge elevator.

The present invention relates to the discharge elevator 10 and to the construction of the elevator storage framework 12 and the associated mechanisms for alternatively stowing the discharge elevator and putting it into its operative position. To obtain further details of the construction and operation of the other aforementioned elements of the tomato harvester, reference may be made to U.S. Pat. Nos. 3,690,383; 3,469,383; and 3,340,935, all of which are assigned to the assignee of the present invention. The first of these patents discloses a vine crop pickup or harvesting mechanism, while the other two patents illustrate and describe prefrred mechanisms for detaching the tomatoes from their vines.

As will presently be described and explained in greater detail, the discharge elevator 10 is of an articulated, or dog-leg, construction. As shown in its operating position in FIG. 3, it has a lower portion, or leg, 14 extending upwardly and outwardly from one side of the storage framework 12 and an upper portion, or leg, 16 projecting outwardly from the lower leg 14 to a position above the receptacle R of the attendant trailer T. After the harvesting is completed, the elevator may be swung downwardly as shown in FIG. 4, and a cradle 18 will be pulled from the framework 12 into a horizontal position below the lower elevator leg 14 for supporting the same. The lower leg of the elevator is then lowered onto the cradle. The upper leg 16 of the elevator may then be pivoted into an upright position normal to the lower leg 14 and secured in such position (as shown in phantom lines in FIG. 4). The input end of the elevator 10 may then be disengaged from its pivotal mounting on the framework 12 and slid, along with the cradle 18, into a stow position within the framework 12, as is shown in FIG. 5. When stowed, the lower leg 14 of the elevator will be located below the cross feed conveyor CC, and the upper leg 16 will be nestled vertically against the side of the harvester, thus presenting only a few inches of added width to the harvester. Preferably, the storage framework 12 is detachable from the main harvester frame F, thus facilitating assembly and shipping of the various parts of the harvester.

The discharge elevator 10, shown in its operating mode in FIGS. 1-3, is pivotably and detachably supported along a pivot axis 20 (FIGS. 6 and 7) from one side of the berth 12 such that the proximal end 21 (FIG. 3) of the endless conveyor belt 22 of the elevator is located below and in close proximity to the discharge end 24 of the cross conveyor CC to thereby receive the tomatoes ejected from the cross conveyor. The belt 22 is an endless belt and includes a continuous series of upstanding flights 26 designed to support the tomatoes as they are elevated. The belt 22 provides uninterrupted conveyance of the tomatoes from its innermost, or proximal, end 21 to its outermost, or distal, end 30 situated above the receptacle R at the outer end of the upper leg 16 of the elevator. A key advantage of having a single continuous belt in the articulated elevator (rather than a separate conveyor in each leg thereof) is that it requires fewer parts and thus is both initially less expensive and easier to maintain.

The elevator conveyor belt 22 is driven by a single hydraulic motor 32 (FIG. 3) connected to a drive roller at the distal end 30 of the belt. The upper leg 16 of the elevator is pivotably connected to the lower leg by a shaft 34 which extends through the side frame members 38 of the lower leg and is mounted by bearing blocks 34a (one only shown in FIG. 8) on the side frame members 37 of the upper leg which permits it to rotate freely relative to the elevator frame structure. An elongated roller 35 (FIG. 3) is affixed to the shaft for supporting the upper run 22a of the conveyor belt 22. The lower run 22b of the conveyor belt 22 is supported at the juncture of the upper and lower elevator legs by an idler device 36 (FIG. 3). The illustrated idler 36 is of a conventional spider-shape adapted to engage the flat surface of the belt between the downwardly projecting flights 26. The idler is journaled in a pair of brackets 39 which are removably attached to the side frame members 38 of the lower leg 14. During stowage of the elevator, the idler is removed from the lower leg 14 before the lower leg is completely lowered onto the cradle 18.

A first hydraulic cylinder 40 is mounted between the harvester H and the lower leg 14, and a second hydraulic cylinder 42 is connected between the upper leg 16 and the lower leg 14—as is shown in FIG. 3. The cylinder 40 is employed to raise and lower the lower leg to thereby adjust the angle of inclination of the lower leg, and the other cylinder 42 is employed to raise and lower the upper leg relative to the lower leg to thus determine the height of the decelerator mechanism DEC and the distance of fall of the tomatoes from the elevator discharge point into the receptacle R. Other mechanisms for adjustably securing the elevator at selected operating angles will be obvious to those skilled in the art. It is not critical that an adjustable device be used to connect the upper leg to the lower leg; that is to say, prior to harvesting the upper and lower legs may be rigidly connected while the lower leg may be adjustably connected to the harvester body, or, the upper leg may be eliminated altogether. It is only essential for the purposes of the present invention that the discharge elevator 10 be pivotably connected to the harvester framework in a manner permitting selection of the height of the outermost discharge end thereof.

As may be seen in FIGS. 1, 3, 7 and 8, the hydraulic cylinders 40 and 42 are both pivotally anchored to upwardly projecting mast structures, respectively designated 44 and 46. The piston elements 52 and 54 of the respective cylinders 40 and 42 are removably and pivotally attached by clevis couplings, 52a (FIG. 8) and 54a (FIG. 1), respectively, to transverse members 74 and 78, respectively, which are secured to the corresponding lower and upper elevator legs 14 and 16. The transverse member 74 (FIG. 8), to which the piston end of the hydraulic cylinder 40 is detachably connected, comprises a structural tube welded to upwardly projecting portions 38a of the side frame members 38 of the lower elevator leg 14 at the outermost end thereof (i.e., near the rotatable connection to the upper leg). The mast structure 44, to which the other end of cylinder 40 is connected, comprises two vertical structural posts 56 and 58 (FIGS. 3 and 7) extending upwardly at the outer corners of the elevator storage framework 12 which posts are interconnected by a cross member 60 that is offset inwardly (FIG. 7) from the plane of the posts 56, 58 by two short support brackets 62 and 64 connected to the top of posts 56 and 58, respectively. To provide rigidity to the mast structure 44, a pair of rods 66 are connected between the cross member 60 and the engine compartment housing EC. The cylinder 40 is connected to the cross member 60 by means of a clevis coupling 48a (FIG. 7) which is swivel mounted at the center of the cross member. When the elevator is in a stow position, the coupling 52a is disconnected so that the hydraulic cylinder 40 hangs vertically downwardly from the cross member 60.

The mast structure 46, as best seen in FIG. 8, is mounted on the elevator assembly where it is connected to the outer end of the lower leg 14. The mast structure 46, which is removable, is comprised of a pair of upstanding side plates 68 and 70 having a cross member 72 welded therebetween. The side plates 68 and 70 are detachably secured by suitable fasteners, such as bolts, to the side frame members 38. The hydraulic cylinder 42 is rotatably mounted about the center of the cross member 72 by a clevis coupling 50a. The piston 54 of the cylinder 42 is rotatably connected, by clevis coupling 54a (FIG. 1) to the transverse member 78, as previously pointed out. The transverse member 78 is affixed to the central portion of the upper leg 16 of the elevator by means of a pair of support plates attached to the side frame members 37.

To provide rigidity to the upper mast structure 46, a pair of guy support rods 82 and 84 (FIG. 8) anchor the side plates 68 and 70 to the side frame members 38 of the lower leg 14, with the lower ends of the rods being removably joined by fasteners such as bolts to short upright plates 82a, 84a welded to the side frame members. The mast structure 46, together with the hydraulic cylinder 42 and the support rods 82 and 84, may be conveniently removed as a single unit from the elevator during the stowing operation, as will be pointed out in greater detail hereinafter.

As seen in FIGS. 6 and 7, the pivot axis 20 at which the elevator's lower leg 14 is supported may comprise two brackets 86 and 88 detachably fastened, such as by a plurality of bolts 90, to a pair of blocks, or shims, 92 which are welded to horizontally opposing inside surface portions of the vertical posts 56 and 58. The brackets 86 and 88 have aligned bores 96 formed therein to rotatably receive a pair of stub shafts 100 and 102 (FIG. 6) welded to the side frame members 38 of the lower leg 14. When the bores of the brackets 86 and 88 supportively and rotatively engage the stub shafts 100 and 102 respectively and the lower leg of the elevator is horizontally disposed (FIG. 4), flanges 104 (FIG. 6) at the lower edges of the side frame members 38 will be spaced (see FIG. 6) from the supporting surface portions of the cradle 18 by a distance sufficient enough to permit the cradle to be readily extracted from or inserted into the storage framework 12. The brackets 86 and 88 can be conveniently bolted in place about the shafts 100, 102 while the inner end of the lower leg is held in a slightly elevated position. Two men can easily assemble and disassemble this pivot attachment of the lower end of the elevator 10 without special equipment.

Having described the discharge elevator 10 and the means for adjustably supporting the upper and lower legs 14, 16 of the elevator at selected angles relative to each other and to the harvester body, reference is now directed to FIGS. 3-7, wherein the construction of the elevator storage framework 12 and cradle 18 are shown in detail. The storage framework 12 (best seen in FIG. 7) has a generally box-like shape and includes four tubular frame members 106, 108, 110, and 112 which extend horizontally in spaced, parallel relationship. Each of the tubular frame members is rigidly connected at one end to one of the vertical corner posts 56 and 58, and the other ends of the tubular frame members are connected to a pair of vertical posts 114 and 116. A pair of bottom frame members 118 and 119 are welded between the bottom ends of the posts 56 and 58 and the posts 114 and 116, respectively. Suitable reinforcing structural members, such as vertical members 120 and cross braces 122 are connected between the various afore-mentioned structural members to complete the framework structure.

The storage framework 12 is removably connected to the rear of the harvester below the engine compartment EC and behind the end of the main frame F. The upper and outer tubular frame member 112 of the berth is detachably connected by suitable fasteners such as bolts (FIGS. 6 and 7) to the support frame members EF. At the inner end of the berth 12, there are provided a pair of structural gusset assemblies 128 which are welded to the upper and inner tubular frame member 106. The gusset assemblies 128 are, in turn, each bolted to a flanged mounting bracket 130 which is welded to the ends of the longitudinal members of the main frame F of the harvester. An upper flange on the gusset assemblies is bolted to the overlying support frame members EF. It will be appreciated that the berth 12 comprises a modular unit which may be transported separately from the harvester body. Inasmuch as the engine compartment EC, the pickup unit PU and the feed elevator FE are also removable from the main frame of the machine, the construction of the discharge elevator and the storage framework assembly permits the harvester to be packaged in standard shipping containers and facilitates assembly after shipping.

The retractable cradle 18 (FIGS. 6 and 7) includes two lightweight parallel rails 132 and 134 which are joined by a series of transverse tubes 136. A pair of slats 138, which extend parallel to the rails and are connected across all but the outermost transverse tube 136a at the outer end of the cradle, provide supporting surfaces for the flights 26 which extend downwardly from the lower run 22b of the elevator conveyor belt 22 when the elevator is mounted on the cradle. The rails 132, 134 of the cradle may be formed from two angle irons connected at their apices by a flat metal plate—as shown in cross section in FIG. 6. A plurality of transversely opposed pairs of rollers 140, 141, 142 and 143 are employed to rollably support the cradle to permit the cradle to be telescoped out from and back into the berth 12 with the elevator 10 resting thereon.

A first pair of support rollers 140 are mounted so as to rollably support the lower surface of each of the cradle rails immediately adjacent the vertical corner posts 56 and 58 (FIG. 7). These rollers 140 are journaled on brackets 140a welded at the bottom ends of the corner posts. Upper and lower opposed pairs of support rollers 141 and 142, respectively, are mounted inwardly from the rollers 140 between the upright posts 120 and the posts 56, 58. The rollers 141 and 142 at each side of the berth are spaced apart sufficiently to engage the upper and lower surfaces, respectively, of the corresponding rails 132 and 134. The rollers 141 and 142 are supported upon the tubular frame members 108, 110 by means of upwardly and downwardly depending brackets as shown in FIGS. 3–5. As shown in FIG. 4, the upper pair of rollers 141 are positioned to abut against stop members 139 (FIG. 7) at the inner ends of the rails 132, 134 when the cradle is fully extended, the cradle thus being cantilevered over the pair of outermost rollers 140 and braced by the pair of upper rollers 141. Finally, a further pair of lower support rollers 143 is disposed toward the innermost end of the storage framework 12, such rollers 143 being supported by brackets 143a extending downwardly from the tubular frame members 108 and 110. All of the support rollers have working, or loadbearing, surfaces of a V-shape which complementarily receive the angled upper and lower surfaces of the rails 132 and 134.

To permit the cradle 18 to be selectively retained in various horizontal positions within the storage framework 12, the corner posts 56 and 58 have bores 146 and 148, respectively, extending therethrough adjacent the lower ends thereof (FIGS. 6 and 7), such bores being dimensioned to selectively receive a pair of stop pins 150 and 152 (FIG. 6). A first set of opposing bores 154 and 156, for registering with the corresponding bores 146 and 148 of the corner posts and for receiving the pins 150 and 152, are formed in the cradle rails 132 and 134 at the outer ends thereof (FIG. 7). When the cradle is retracted into the berth, the pins 150 and 152 are engaged through the corner posts and into the outer bores 154 and 156 to securely lock the cradle within the storage framework 12. When the cradle is retracted the inner end 21 of the discharge conveyor (the end portions of the side frame members 38) may pivot downwardly between the outermost two transverse members 136a and 136b of the cradle as the elevator is pivoted upwardly into its operating position (see FIG. 2).

A second set of opposing bores 160 and 162 (FIG. 7) are formed in the cradle rails 132, 134 at a selected distance from the inner ends of the rails. As shown in FIG. 4, when the pins 150 and 152 are engaged in the bores 160 and 162, the cradle is retained in an extended position with the upper pair of support rollers 141 acting to prevent the extended outer end of the cradle from pivoting downwardly. This extended cradle position is used during the assembly and stowing operations as will be explained hereinafter.

Near the outer end of the lower leg 14 of the elevator, a pair of indents 166 are formed in lower surface portions of the side frame members 38 (one indent only being shown in FIG. 8). These indents 166 are shaped to engage the outermost transverse tube 136a of the cradle, thereby preventing the elevator from sliding on the cradle once it is laid to rest thereon. When the cradle is in the aforedescribed extended position and the elevator is resting thereon with the indents 166 engaged upon the tube 136a, the stub shafts 100, 102 of the lower leg will be situated just below their normal swivel mounting to permit easy manipulation of the lower leg 14 and attachment of the brackets 86 and 88 to the framework corner posts 56 and 58 with the shafts 100, 102 being engaged in the bracket bores 96. To attach the brackets 86, 88 it is only necessary to slightly prop up the inner end of the lower leg 14; because, when the brackets are being attached, the elevator is prevented from moving on the cradle by the engagement of the outer tube 136a in the indents 166 while the cradle itself is prevented from moving by the stop pins 150 and 152. The present invention thus permits two persons to easily prop up the lower leg 14 of the elevator to attach the brackets; vice versa, it permits two persons to readily disassemble and store the elevator upon the cradle.

A brief operational sequence will now be presented to more fully explain the cooperation of the various elements of the improved discharge elevator assembly of the present invention. As previously mentioned, FIGS. 1 and 3 show the operative configuration of the discharge elevator 10. The pistons of the hydraulic cylinders 40 and 42 are retracted sufficiently to provide selected angles between the lower leg 14 and the body of the harvester and between the upper leg 16 and the lower leg 14. The decelerator mechanism DEC, attached to the outer end of the upper leg 16, controls the feeding of the tomatoes into the receptacle R of the trailer T upon discharge from the elevator. As shown by the arrows in FIGS. 2 and 3, the loose tomatoes are discharged rearwardly from the rear sorter conveyors RSTC onto the rear cross feed conveyor CC, from the cross feed conveyor to the discharge elevator 10, and upwardly across the discharge elevator into the attendant receptacle R.

After harvesting is completed, the elevator 10 is lowered into a generally horizontally extended position on the cradle 18, as shown in FIG. 4. To accomplish this, it is first necessary to partially lower the lower leg 14 of the elevator and remove the idler mechanism 36. Then the locking pins 150 and 152 may be removed from the side rails 132 and 134, and the cradle 18 may be slid to its extended position, shown in FIG. 4, where the pins can be reinserted in the bores 160 and 162 of the cradle rails. The elevator is then lowered onto the cradle, and the indents 166 automatically engage the outer transverse tube 136a of the support cradle.

It is next necessary to remove the mast structure 46 (FIG. 8) by removing the pin from the clevis coupling 52a at the end of the piston 52 to free the cylinder 40, then removing the clevis 54a connected to the end of piston 54 to free the cylinder 42, thereafter disconnecting the guy rods 82 and 84 from the side frame members 38 of the lower leg 14, and finally removing the bolts connecting the mast plates 68 and 70 from the lower leg. The decelerator mechanism DEC is then disconnected, and the upper leg 16 is swung to a vertical position, i.e., at an angle of approximately 90° with the lower leg (see FIG. 4). To secure the upper leg in the vertical position, a pair of bolts are fastened through brackets 172 (FIG. 8) welded to the side frame members 37 of the upper leg and into hollow, threaded projections 174 (FIG. 8) secured to the frame members 38 of the lower leg at the outer end thereof, thereby maintaining the upper leg in the vertical position. The upper and lower legs thus form an L-shape, the short upper leg being generally vertical and the long lower leg being generally horizontal.

Since the discharge elevator 10 is in a position such that the indents 166 are engaged upon the tube 136a of the cradle, the brackets 86 and 88, which pivotably join the elevator to the harvester, can then be removed to allow the lower leg to be pivoted about the tube 136a to a full horizontal position on the cradle. The pins 150 and 152 are then removed, and the cradle is pushed into the storage framework 12. Finally, the pins 150 and 152 are reinserted through the corner posts 56 and 58 of the framework to be received in the outer set of bores 154 and 156 formed in the cradle rails. At this time, the upper leg 16 of the elevator will be nestled closely to the side of the harvester (as shown in FIG. 5), and the elevator will not slide from its storage berth due to the stop pins 150 and 152. The short, outer leg 16 of the elevator does not extend very far above the ground surface, thus avoiding the possibility of damage to the elevator when the harvester is moved from field to field.

Although the best mode contemplated for carrying out the present invention has been herein shown and described, it will be apparent that modification and variation may be made without departing from what is regarded to be the subject matter of the invention.

What is claimed is:

1. An improved harvester including a main frame movable along a path, means mounted on the frame for picking up crops along said path, first conveyor means for moving harvested crops longitudinally in a direction generally parallel to said path, second conveyor means for receiving crops from said first conveyor means and for moving said crops transversely toward one side of said harvester, and discharge elevator means for receiving crops transferred from said second conveyor means and for moving said crops upwardly and outwardly with respect to said one side of said harvester, wherein the improvement comprises: said elevator means comprising an articulated structure having an upper leg and a lower leg which has an outer end that is pivotally interconnected to the inner end of said upper leg and further having means for pivoting said upper leg relative to said lower leg, a storage framework transversely mounted to said main frame, said framework defining a storage channel situated directly below said second conveyor means, cradle means slidable within said channel for supporting said elevator means in a generally horizontal position when the elevator means is to be stored and also when it is to be pivotally interconnected to said framework, said cradle means being arranged to support, during the storage of said elevator means, said lower leg of the elevator means within the confines of said channel while said upper leg is pivoted into a vertical position directly adjacent said one side of the body of the harvester, said cradle means continuing to support said elevator means as it is pulled from said channel to a laterally extended position whereat the inner end of said lower leg is adjacent the discharge end of said second conveyor means to thereby facilitate the detachable pivotal attachment of said lower leg to said framework means; said framework and said elevator means having means for permitting their detachable, pivotal interconnection.

2. The improved harvester of claim 1 wherein said cradle means for slidably supporting said elevator means includes a cradle unit having two spaced-apart rails and a series of cross members connected between said rails, and roller means mounted to said framework for rotatively supporting each of said rails as said cradle is pulled from or pushed into said framework.

3. The improved harvester according to claim 1 further including means for engaging said lower leg at a selected position on said cradle means to prevent said lower leg from moving longitudinally on said cradle means, and means for locking said cradle means at selected positions within said framework to thereby maintain said elevator means in a stored position in said harvester during travel of the harvester and also facilitating assembly of said means for permitting the pivotal connection of said lower leg to said framework.

4. The improved harvester of claim 3 wherein said means for engaging said lower leg on said cradle means comprises indentations formed on lower surface portions of said lower leg, and means embodied in said cradle means for mating with said indentations.

5. The harvester of claim 3 wherein said means for locking said cradle means at selected positions within said framework comprises bores formed at selected longitudinal locations in said cradle means, a second set of bores formed in said framework at locations for registering with said cradle means bores, and removable pin means for insertion in said framework bores and into selected bores in said cradle means to thereby retain said cradle means at selected positions within said framework.

6. In combination with a machine for harvesting crops including a main frame movable along a path, means mounted on said frame for harvesting crops along said path, and means for conveying harvested crops in a direction transverse to the direction of said path, an improved discharge elevator assembly which is retractable from an operative crop discharging configuration, wherein crops are received by the elevator assembly from said transverse conveying means and are elevated outwardly thereby to above an attendant receptacle moving separately from said main frame, into a compact storage configuration, said discharge elevator assembly comprising: an articulated discharge elevator unit including a lower leg having first and second ends, an upper leg having a first end pivotably connected to said first end of the lower leg and a second end, endless belt means for conveying crops fed to said second end of the lower leg to said second end of the upper leg, and means for driving said endless belt means; means for storing said articulated elevator unit with said lower leg being generally horizontally disposed in an orientation which is transverse to said path of movement of the main frame and with said upper leg projecting vertically upwardly at one side of the harvester, said storing means including: a framework attached to said main frame, said framework defining a transversely oriented channel for receiving said lower elevator leg with said first end of said lower leg being positioned proximal to the entrance of said framework channel, thereby providing a compact storage configuration for said elevator unit; means for slidably supporting said elevator lower leg within said framework, said supporting means continuing to support said elevator unit as it is pulled from said framework channel to a laterally extended position whereat said second end of the lower leg is adjacent the discharge end of said transverse conveying means, thereby facilitating the pivotal attachment of the lower leg; detachable means for pivotably connecting said second end of said lower leg adjacent the entrance to said framework such that said endless belt means is disposed to receive crops from said transverse conveying means, whereby said lower leg may be rotated upwardly into a harvesting configuration; means for adjustably supporting said first end of said lower leg at a selected elevation and means connected between said lower and upper legs for supporting said upper leg at a selected angle relative to said lower leg.

7. The combination according to claim 6 wherein said means for slidably supporting said lower leg within said framework comprises two spaced-apart parallel rail members extending longitudinally of said tubular framework, each of said rail members being received by a plurality of roller units mounted to said framework.

8. An improved harvester including a main frame movable along a path, means mounted on the frame for picking up crops along said path, first conveyor means for moving harvested crops longitudinally in a direction generally parallel to said path, second conveyor means for receiving crops from said first conveyor means and for moving said crops transversely toward one side of said harvester, and discharge elevator means for receiving crops transferred from said second conveyor means and for moving said crops upwardly and outwardly with respect to said one side of said harvester, wherein the improvement comprises: a storage framework mounted to said main frame; said elevator means comprising an articulated structure having an upper leg and a lower leg pivotally interconnected to said upper leg with said lower leg being arranged for pivotal connection to said framework, means for pivoting said lower leg relative to the body of the harvester, and means for pivoting said upper leg relative to said lower leg; cradle means slidable within said framework for supporting said elevator means in a generally horizontal position when the elevator means is to be stored, said cradle means being arranged to support only said lower leg of the elevator means while said upper leg is pivoted into a vertical position directly adjacent the body of the harvester when said elevator means is stored, said cradle means permitting said elevator means to be pulled from and pushed back into said framework; said framework and said elevator means having means for permitting their detachable, pivotal interconnection; means for engaging said lower leg at a selected position on said cradle means to prevent said lower leg from moving longitudinally on said cradle means, and means for locking said cradle means at selected positions within said framework to thereby maintain said elevator means in a stored position in said harvester during travel of the harvester and also facilitating assembly of said means for permitting the pivotal connection of said lower leg to said framework.

9. The improved harvester of claim 8 wherein said means for engaging said lower leg on said cradle means comprises indentations formed on lower surface portions of said lower leg, and means embodied in said cradle means for mating with said indentations.

10. The harvester of claim 8 wherein said means for locking said cradle means at selected positions within said framework comprises bores formed at selected longitudinal locations in said cradle means, a second set of bores formed in said framework at locations for registering with said cradle means bores, and removable pin means for insertion in said framework bores and into selected bores in said cradle means to thereby retain said cradle means at selected positions within said framework.

* * * * *